United States Patent
Sako et al.

(10) Patent No.: US 12,300,784 B2
(45) Date of Patent: May 13, 2025

(54) LITHIUM ION SECONDARY BATTERY

(71) Applicant: Panasonic Intellectual Property Management Co., Ltd., Osaka (JP)

(72) Inventors: Honami Sako, Osaka (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 504 days.

(21) Appl. No.: 17/705,446

(22) Filed: Mar. 28, 2022

(65) Prior Publication Data

US 2022/0216514 A1    Jul. 7, 2022

Related U.S. Application Data

(63) Continuation of application No. PCT/JP2021/008441, filed on Mar. 4, 2021.

(30) Foreign Application Priority Data

May 28, 2020 (JP) ................................. 2020-093782

(51) Int. Cl.
| | |
|---|---|
| H01M 10/0565 | (2010.01) |
| H01M 10/0525 | (2010.01) |
| H01M 10/0568 | (2010.01) |
| H01M 10/0569 | (2010.01) |

(52) U.S. Cl.
CPC ... *H01M 10/0565* (2013.01); *H01M 10/0525* (2013.01); *H01M 10/0568* (2013.01); *H01M 10/0569* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 5,874,185 A | 2/1999 | Wang et al. | |
| 2022/0344712 A1* | 10/2022 | Su | H01M 10/058 |

FOREIGN PATENT DOCUMENTS

| | | |
|---|---|---|
| CN | 105826603 A | 8/2016 |
| CN | 107492680 A | 12/2017 |
| CN | 107732297 A | 2/2018 |
| CN | 107768717 | 3/2018 |
| CN | 108511687 | 9/2018 |
| CN | 110676433 | 1/2020 |
| CN | 110994015 | 4/2020 |
| JP | 10-334945 | 12/1998 |
| JP | 2001-283911 | 10/2001 |
| JP | 2013-062038 | 4/2013 |

OTHER PUBLICATIONS

Machine Translation of CN107732297A (Year: 2019).*
Machine Translation of CN107768717A (Year: 2018).*
Machine Translation of CN110676433A (Year: 2020).*
Machine Translation of JP2013062038A (Year: 2013).*
Chen et al.; "Poly(vinylene carbonate)-Based Composite Polymer Electrolyte with Enhanced Interfacial Stability To Realize High-Performance Room-Temperature Solid State Sodium Batteries"; ACS Appl. Mater. Interfaces 2019, 11, pp. 43056-43065. (Year: 2019).*
Machine Translation of JP 10-334945A (Year: 1998).*
International Search Report of PCT application No. PCT/JP2021/008441 dated May 18, 2021.
Jingchao Chai et al., "In Situ Generation of Poly (Vinylene Carbonate) Based Solid Electrolyte with Interfacial Stability for LiCoO2 Lithium Batteries", Advanced Science, Feb. 24, 2017, 4, 1600377.
The EPC Office Action dated Oct. 18, 2024 for the related European Patent Application No. 21811975.8.

* cited by examiner

*Primary Examiner* — Gregg Cantelmo
(74) *Attorney, Agent, or Firm* — Rimon P.C.

(57) ABSTRACT

A lithium ion secondary battery includes a positive electrode, a negative electrode, and an electrolyte disposed between the positive electrode and the negative electrode. The electrolyte includes a polymeric electrolyte. The polymeric electrolyte is composed of a polymer and a lithium salt of a fluorosulfonyl-group-containing compound, and the polymer is a polymer of a vinylene carbonate species. The lithium salt of a fluorosulfonyl-group-containing compound includes lithium bis(fluorosulfonyl)imide.

8 Claims, 2 Drawing Sheets

LITHIUM ION SECONDARY BATTERY

BACKGROUND

1. Technical Field

The present disclosure relates to a lithium ion secondary battery.

2. Description of the Related Art

In lithium ion secondary batteries, on which research and development have been actively conducted in recent years, the electrolyte used has a significant influence not only on battery characteristics such as the charge-discharge rate, charge-discharge cycle life characteristics, and storage characteristics but also on safety properties. Accordingly, attempts have been made to improve battery characteristics by modifying the electrolyte.

Liquid-form electrolytes, which are formed of a solvent and a lithium-containing supporting salt, use, in many cases, a nonaqueous solvent, which has a wider potential window than water, so that the energy density can be improved. However, liquid-form electrolytes present problems associated with safety, such as liquid leakage from a battery cell and possible ignition of a flammable electrolyte solution. To overcome these problems to improve a safety property, research on solid electrolytes is being advanced.

Polymeric solid electrolytes can be formed into a film shape and, therefore, can be free of interparticle voids. In addition, polymeric solid electrolytes have flexibility and, therefore, can be provided in the form of a thin film, and, accordingly, polymeric solid electrolytes are expected to provide an improvement in ease of incorporation into electronic devices and an improvement in design flexibility for electronic devices. Polymeric solid electrolytes that are being studied include polyethylene-oxide-based polymers. In polyethylene-oxide-based polymers, it is believed that lithium ions are coordinated to the oxygen atoms present in the backbone, and the lithium ions hop in the molecules of the polymer chains and are, accordingly, transported.

Japanese Unexamined Patent Application Publication No. 2001-283911 discloses a battery that includes a polymeric electrolyte, with the precursor of the polymeric electrolyte containing a vinylene carbonate species. Japanese Unexamined Patent Application Publication No. 10-334945 discloses a battery in which an electrolyte includes a copolymer that includes fluoroolefin-based polymer units and vinylene-carbonate-based polymer units.

SUMMARY

One non-limiting and exemplary embodiment of the present disclosure provides a high-power lithium ion secondary battery.

In one general aspect, the techniques disclosed here feature a lithium ion secondary battery including a positive electrode, a negative electrode, and an electrolyte disposed between the positive electrode and the negative electrode. The electrolyte includes a polymeric electrolyte. The polymeric electrolyte is composed of a polymer and a lithium salt of a fluorosulfonyl-group-containing compound, and the polymer is a polymer of a vinylene carbonate species. The lithium salt of a fluorosulfonyl-group-containing compound includes lithium bis(fluorosulfonyl)imide.

With the present disclosure, a high-power lithium ion secondary battery is provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
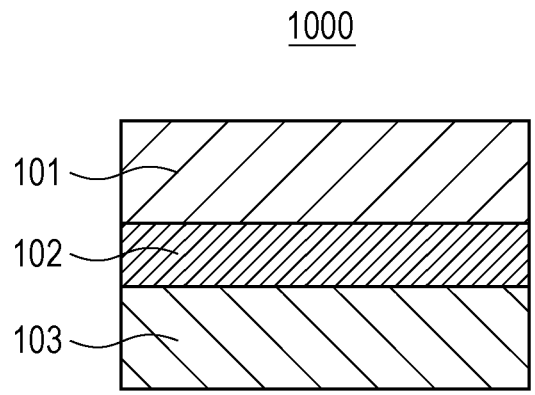
FIG. 1 is a schematic diagram illustrating a general configuration of a lithium ion secondary battery of a present embodiment.

Underlying Knowledge Forming Basis of the Present Disclosure

Polyethylene-oxide-based polymers have a problem of low ionic conductivity, which results from the fact that the high crystallinity of polyethylene-oxide-based polymers hinders the transport of lithium ions.

To address the problem, studies have been conducted. The studies include adding a solvent and/or an electrolyte solution as a plasticizing agent to increase the amorphousness of the polymer, thereby improving ionic conductivity. However, it turned out that even in instances where ionic conductivity could be improved, the polymer itself had a low capacity for holding a solvent, or a large amount of solvent, for example, in an amount of at least 50 mass % or greater, had to be added (see Japanese Unexamined Patent Application Publication No. 2001-283911 and Japanese Unexamined Patent Application Publication No. 10-334945). As a result, the problem of liquid leakage occurred as with batteries that use an electrolyte solution.

Accordingly, there is a need for an electrolyte that has high ionic conductivity and which can reduce the amount of liquids, such as an electrolyte solution and solvent, to be added.

There is a report of a study conducted on an organic ion conductor that uses vinylene carbonate as a principal component (J. Chai, Z. Liu, et al. Adv. Sci. 10 Nov. 2016, Volume 4, 1600377). According to the report, it was observed that an electrolyte that included lithium difluoro (oxalato)borate (LiDFOB) at a concentration of 1 mol/L exhibited an ionic conductivity of $9.82 \times 10^{-5}$ S/cm at 50° C. However, LiDFOB has low solubility in vinylene carbonate, that is, only approximately less than or equal to 3 mol/L of LiDFOB is soluble in vinylene carbonate. Thus, achieving a further improvement in ionic conductivity is difficult.

The present disclosure provides a lithium ion secondary battery in which a polymeric electrolyte itself has improved ionic conductivity. The lithium ion secondary battery of the present disclosure includes a polymer as an electrolyte. The polymer has a polar structure that forms conduction paths in which lithium ions can easily hop. The backbone of the polymer is formed of vinylene carbonate or a derivative thereof, which has relatively high ionic conductivity even at room temperature.

The lithium ion secondary battery of the present disclosure includes a polymeric electrolyte that is resistant to liquid leakage and which has a higher ionic conductivity than existing materials. This is realized, for example, by synthesizing the polymer in a state in which a highly soluble lithium salt is dissolved in a vinylene carbonate species.

Overview of Aspects of the Present Disclosure

According to a first aspect of the present disclosure, a lithium ion secondary battery includes:
- a positive electrode;
- a negative electrode; and
- an electrolyte disposed between the positive electrode and the negative electrode, wherein
  the electrolyte includes a polymeric electrolyte,
  the polymeric electrolyte is composed of a polymer and a lithium salt of a fluorosulfonyl-group-containing compound, and the polymer is a polymer of a vinylene carbonate species, and
  the lithium salt of a fluorosulfonyl-group-containing compound includes lithium bis(fluorosulfonyl)imide.

With the first aspect, a high conductivity is achieved. Accordingly, a high-power lithium ion secondary battery is realized.

In a second aspect of the present disclosure, the lithium ion secondary battery according to the first aspect may be such that, for example, the vinylene carbonate species is a compound represented by formula (1) below,

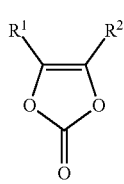

(1)

where $R^1$ and $R^2$ each independently represent a hydrogen atom, an optionally substituted alkyl group, an optionally substituted aryl group, or a halogen atom.

In a third aspect of the present disclosure, the lithium ion secondary battery according to the first or second aspect may be such that, for example, the polymer of a vinylene carbonate species is a homopolymer of a vinylene carbonate species.

In a fourth aspect of the present disclosure, the lithium ion secondary battery according to any one of the first to third aspects may be such that, for example, the polymer of a vinylene carbonate species is poly(vinylene carbonate).

With any of the first to fourth aspects, a high-power lithium ion secondary battery including a polymeric electrolyte that has high ionic conductivity is provided.

In a fifth aspect of the present disclosure, the lithium ion secondary battery according to any one of the first to fourth aspects may be such that, for example, the polymeric electrolyte contains a nonaqueous solvent in an amount less than 40 mass %.

In a sixth aspect of the present disclosure, the lithium ion secondary battery according to the fifth aspect may be such that, for example, the nonaqueous solvent includes at least one selected from the group consisting of cyclic carbonates, chain carbonates, and sulfolanes.

In a seventh aspect of the present disclosure, the lithium ion secondary battery according to the fifth aspect may be such that, for example, the nonaqueous solvent includes at least one selected from the group consisting of ethylene carbonate, fluoroethylene carbonate, propylene carbonate, dimethyl carbonate, ethyl methyl carbonate, diethyl carbonate, and sulfolane.

With any of the fifth to seventh aspects, the lithium ion secondary battery of the present disclosure has a reduced risk of liquid leakage and, therefore, has an excellent safety property.

In an eighth aspect of the present disclosure, the lithium ion secondary battery according to the fifth aspect may be such that, for example, the nonaqueous solvent includes ethylene carbonate.

Embodiments of the present disclosure will now be described with reference to the drawings. The present disclosure is not limited to the embodiments described below.

EMBODIMENTS

FIG. 1 is a cross-sectional view illustrating a general configuration of a battery 1000 of the present embodiment. A lithium ion secondary battery of the present embodiment includes a positive electrode 101, an electrolyte 102, and a negative electrode 103. The electrolyte 102 is disposed between the positive electrode 101 and the negative electrode 103. The electrolyte 102 includes a polymeric electrolyte. The polymeric electrolyte includes a polymer and a lithium salt of a fluorosulfonyl-group-containing compound, and the polymer is a polymer of a vinylene carbonate species. In the electrolyte 102, the polymeric electrolyte may be a principal component. The term "principal component" means a component present in the largest amount in terms of a mass ratio. In the electrolyte 102, a content of the polymeric electrolyte may be, for example, greater than or equal to 50 mass % or greater than or equal to 60 mass %. In the electrolyte 102, the content of the polymeric electrolyte may be greater than or equal to 80 mass %, greater than or equal to 90 mass %, or 100 mass %. In the present disclosure, the term "vinylene carbonate species" means vinylene carbonate or a derivative thereof. The derivative of the vinylene carbonate is a derivative in which one or more hydrogen atoms of vinylene carbonate are replaced with a substituent.

The vinylene carbonate species may be a compound represented by formula (1) below.

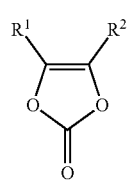

(1)

In formula (1), $R^1$ and $R^2$ each independently represent a hydrogen atom, an optionally substituted alkyl group, an optionally substituted aryl group, or a halogen atom. The alkyl group may be linear or branched. The alkyl group as $R^1$ and the alkyl group as $R^2$ may each independently have 1 to 8 carbon atoms, 1 to 6 carbon atoms, or 1 to 4 carbon atoms. Examples of the alkyl groups include methyl groups, ethyl groups, n-propyl groups, isopropyl groups, n-butyl groups, isobutyl groups, n-pentyl groups, n-hexyl group, n-heptyl group, and n-octyl groups. $R^1$ and $R^2$ may each independently be an unsubstituted alkyl group. In instances where the alkyl groups are substituted with one or more substituents, the number of the substituents may be 1 to 6, 1 to 4, or 1 to 3. The aryl group as $R^1$ and the aryl group as $R^2$ may each independently have 6 to 14 carbon atoms or 6 to 10 carbon atoms. Examples of the aryl groups include phenyl groups and naphthyl groups. $R^1$ and $R^2$ may each independently be an unsubstituted phenyl group. The substituents that may be present in the alkyl groups and the substituents that may be present in the aryl groups may each independently be a halogen atom, an alkyl group having 1 to 6 carbon atoms, a hydroxy group, or the like. The halogen atom as R', the halogen atom as $R^2$, and the halogen atom as the substituent may be a fluorine atom, a chlorine atom, a bromine atom, or an iodine atom. $R^1$ and $R^2$ may each be a hydrogen atom.

The polymer of a vinylene carbonate species may be a homopolymer of a vinylene carbonate species or a copolymer containing a vinylene carbonate species. The copolymer may be a copolymer of a vinylene carbonate species with a fluoroolefin. The fluoroolefin may be tetrafluoroethylene, chlorotrifluoroethylene, vinylidene fluoride, or hexafluoropropylene. The copolymer may contain the structural units of the vinylene carbonate species and units of a monomer different from fluoroolefin. Examples of the different monomer include vinyl fluoride, trifluoroethylene, hexafluoroacetone, perfluoro(methyl vinyl ether), perfluoro(propyl vinyl ether), (perfluorobutyl)ethylene, (perfluorooctyl)propylene, ethylene, propylene, isobutylene, vinyl pivalate, vinyl acetate, vinyl benzoate, ethyl vinyl ether, butyl vinyl ether, cyclohexyl vinyl ether, chloroethyl vinyl ether, ethyl allyl ether, cyclohexyl allyl ether, norbornadiene, crotonic acid and esters thereof, acrylic acid and alkyl esters thereof, and methacrylic acid and alkyl esters thereof. Two or more selected from these may be used in combination.

The fluorosulfonyl-group-containing compound may be any compound that contains a fluorosulfonyl group represented by $-SO_2F$. The fluorosulfonyl-group-containing compound may be a bis(fluorosulfonyl)imide. The lithium salt of a fluorosulfonyl-group-containing compound may have a molecular weight of less than or equal to 500, less than or equal to 300, or less than or equal to 250. The lithium salt of a fluorosulfonyl-group-containing compound of the present disclosure has excellent film-forming ability. Furthermore, the lithium salt of a fluorosulfonyl-group-containing compound of the present disclosure has excellent solubility in vinylene carbonate species. In addition, the polymeric electrolyte containing the lithium salt of a fluorosulfonyl-group-containing compound of the present disclosure has high ionic conductivity at room temperature.

The lithium salt of a fluorosulfonyl-group-containing compound may include lithium bis(fluorosulfonyl)imide. In the polymeric electrolyte, a concentration of the lithium salt of a fluorosulfonyl-group-containing compound may be 1 mol/L or greater and 7 mol/L or less, or may be 2 mol/L or greater and 6 mol/L or less.

The polymeric electrolyte of the present embodiment may contain a nonaqueous solvent in an amount less than 40 mass %. The content of the nonaqueous solvent may be less than 35 mass %, less than 30 mass %, less than 20 mass %, or less than 10 mass %. In the related art, polymeric electrolytes had low ionic conductivity and, therefore, had to contain a nonaqueous solvent in an amount greater than or equal to 50 mass % to provide a high ionic conductivity. On the other hand, the use of a large amount of a nonaqueous solvent posed a risk of liquid leakage. In contrast, in the polymeric electrolyte used in the lithium ion secondary battery of the present disclosure, the ionic conductivity at room temperature is dramatically improved, and as a result, the amount of a nonaqueous solvent can be reduced. As a result of the reduction in the amount of a nonaqueous solvent, the lithium ion secondary battery of the present disclosure has a reduced risk of liquid leakage and, therefore, has an excellent safety property.

In the present embodiment, the nonaqueous solvent may include at least one selected from the group consisting of cyclic carbonates, chain carbonates, and sulfolanes. Examples of the cyclic carbonates include ethylene carbonate, fluoroethylene carbonate, propylene carbonate, and butylene carbonate. Examples of the chain carbonates include dimethyl carbonate, ethyl methyl carbonate, fluoroethyl methyl carbonate, and diethyl carbonate. Examples of the sulfolanes include 3-methylsulfolane and 2,4-dimethylsulfolane. The nonaqueous solvent may include at least one selected from the group consisting of ethylene carbonate, fluoroethylene carbonate, propylene carbonate, dimethyl carbonate, ethyl methyl carbonate, diethyl carbonate, and sulfolane.

The polymeric electrolyte of the present embodiment may have any shape. Examples of a shape of the polymeric electrolyte include pellet shapes, plate shapes, and film shapes. When the polymeric electrolyte of the present embodiment is a film, a thickness of the film may be 1 μm or greater and 100 μm or less.

The polymeric electrolyte of the present embodiment may be produced by any method. For example, the polymeric electrolyte may be produced by a method in which a lithium salt of a fluorosulfonyl-group-containing compound is dissolved in a monomer of a vinylene carbonate species, and polymerization is carried out by using a known method. Examples of the method for polymerization include thermal polymerization and photopolymerization. A polymerization initiator used in the polymerization may be a known polymerization initiator. Examples of the polymerization initiator include azo-based polymerization initiators and peroxide-based initiators. Examples of the azo-based polymerization initiators include 2,2'-azobis(isobutyronitrile), and 2,2'-azobis(2,4-dimethylvaleronitrile). Examples of the peroxide-based initiators include ketone peroxides, hydroperoxides, diacyl peroxides, dialkyl peroxides, peroxyketals, peroxyesters, and peroxydicarbonates. The polymeric electrolyte may be produced by using a different method, in which, for example, a lithium salt of a fluorosulfonyl-group-containing compound and a vinylene carbonate species are dissolved in a nonaqueous solvent, and polymerization is carried out by using a known method.

The electrolyte including the polymeric electrolyte of the present disclosure is to be used as a lithium ion conducting membrane. The polymeric electrolyte itself may be used as the lithium ion conducting membrane. The lithium ion conducting membrane may have any thickness. A thickness of the lithium ion conducting membrane may be greater than or equal to 0.1 μm, greater than or equal to 1 μm, or greater than or equal to 10 μm. Furthermore, the thickness of the lithium ion conducting membrane may be less than or equal to 1000 μm, less than or equal to 800 μm, or less than or equal to 500 μm.

The positive electrode 101 includes a material capable of occluding and releasing lithium ions. The positive electrode 101 may include a positive electrode active material, for example. The positive electrode active material may have any shape and may be in the form of particles, a powder, or pellets. The positive electrode active material may be compacted with a binder. Examples of the binder include resins, such as polyvinylidene fluoride, polypropylene, polyethylene, and polyimide.

Examples of the positive electrode active material include lithium transition metal oxides, lithium transition metal fluorides, lithium polyanion materials, lithium fluorinated polyanion materials, lithium transition metal sulfides, lithium transition metal oxysulfides, and lithium transition metal oxynitrides. Examples of the lithium transition metal oxides include Li(NiCoAl)$O_2$, Li(NiCoMn)$O_2$, and LiCoO$_2$.

In instances where the positive electrode 101 includes a positive electrode active material, the positive electrode active material may include a lithium transition metal oxyfluoride. With this configuration, the charge-discharge efficiency of the battery is improved.

The lithium transition metal oxyfluoride includes anions, which may be at least anions of O (i.e., oxygen) and anions of F (i.e., fluorine). The lithium transition metal oxyfluoride may be a compound represented by a composition formula of $Li_pMe_qO_mF_n$. In the formula, Me is at least one element selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P. Furthermore, the following relationships are satisfied: $0.5 \leq p \leq 1.5$; $0.5 \leq q \leq 1.0$; $1 \leq m < 2$; and $0 < n \leq 1$. Another example of the lithium transition metal oxyfluoride represented by the composition formula of $Li_pMe_qO_mF_n$ is $Li_{1.05}(Ni_{0.35}Co_{0.35}Mn_{0.3})_{0.95}O_{1.9}F_{0.1}$. With any of these configurations, the charge-discharge efficiency of the battery is further improved.

The positive electrode active material may include lithium phosphate. In instances where lithium phosphate is used, a battery that is relatively inexpensive and has a high safety property can be provided.

The lithium ion secondary battery of the present embodiment may include a different electrolyte material, other than the polymeric electrolyte of the present disclosure. Examples of the different electrolyte material include $Li_2MgX_4$, $Li_2FeX_4$, Li(Al, Ga, In)$X_4$, $Li_3$(Al, Ga, In)$X_6$, and LiI. In the formulae, X is at least one element selected from the group consisting of F, Cl, Br, and I.

The negative electrode 103 includes a material capable of occluding and releasing lithium ions. The negative electrode 103 may include a negative electrode active material, for example. The negative electrode active material may have any shape and may be in the form of particles, a powder, or pellets. The negative electrode active material may be compacted with a binder. Examples of the binder include resins, such as polyvinylidene fluoride, polypropylene, polyethylene, and polyimide.

Examples of the negative electrode active material include metal materials, carbon materials, oxides, nitrides, tin compounds, and silicon compounds. The metal materials may be elemental metals or alloys. Examples of the metal materials include lithium metal and lithium alloys. Examples of the carbon materials include natural graphite, coke, partially-graphitized carbon, carbon fibers, spherical carbon, artificial graphite, and amorphous carbon. Silicon (Si), tin (Sn), a silicon compound, or a tin compound may be used to achieve a capacity density.

The negative electrode active material may be an active material that occludes and releases lithium ions at 0.27 V or greater versus lithium, for example. Examples of the negative electrode active material include titanium oxides, indium metal, and lithium alloys. Examples of the titanium oxides include $Li_4Ti_5O_{12}$, $LiTi_2O_4$, and $TiO_2$. With any of these configurations, the charge-discharge efficiency of the battery is improved.

The negative electrode 103 may include a sulfide solid electrolyte material and a negative electrode active material. With this configuration, the sulfide solid electrolyte material, which is electrochemically stable, reduces the internal resistance of the battery.

At least one selected from the group consisting of the positive electrode 101, the electrolyte 102, and the negative electrode 103 may include a different solid electrolyte material, other than the polymeric electrolyte of the present embodiment, so that the ionic conductivity can be enhanced. Examples of the different solid electrolyte material other than the polymeric electrolyte of the present embodiment include sulfide solid electrolyte materials, oxide solid electrolyte materials, and halide solid electrolyte materials. In the present disclosure, the "sulfide solid electrolyte material" is a solid electrolyte material containing sulfur. In the present disclosure, the "oxide solid electrolyte material" is a solid electrolyte material containing oxygen. The oxide solid electrolyte material may contain additional anions, in addition to anions of oxygen. The additional anions may be anions other than those of sulfur or of halogen elements. In the present disclosure, the "halide solid electrolyte material" is a solid electrolyte material containing a halogen element and not containing sulfur. The halide solid electrolyte material may contain additional anions, in addition to anions of the halogen element. The additional anions may be anions of oxygen.

Examples of the sulfide solid electrolyte material include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Two or more selected from these may be used in combination.

Examples of the oxide solid electrolyte material include NASICON-type solid electrolytes typified by $LiTi_2(PO_4)_3$ and element-substituted derivatives thereof; (LaLi)TiO$_3$-system perovskite-type solid electrolytes; LISICON-type solid electrolytes typified by $Li_{14}ZnGe_4O_{16}$, $Li_4SiO_4$, LiGeO$_4$, and element-substituted derivatives thereof garnet-type solid electrolytes typified by $Li_7La_3Zr_2O_{12}$ and element-substituted derivatives thereof and $Li_3PO_4$ and N-substituted derivatives thereof. Two or more selected from these may be used in combination.

Examples of the halide solid electrolyte material include compounds represented by $Li_aMe_bY_cX_6$. In the formula, a+mb+3c=6 is satisfied, and c>0 is satisfied; Me is at least one selected from the group consisting of metalloid elements and metal elements other than Li or Y; and m represents the valence of Me. The "metalloid elements" refers to B, Si, Ge, As, Sb, and Te. The "metal elements" are all the elements (excluding hydrogen) from Group 1 to Group 12 of the periodic table and all the elements (excluding B, Si, Ge, As, Sb, Te, C, N, P, O, S and Se) from Group 13 to Group 16 of the periodic table. That is, the "metal elements" are elements that can become a cation in instances in which the element forms an inorganic compound with a halide. Me may be at least one element selected from the group consisting of Mg, Ca, Sr, Ba, Zn, Sc, Al, Ga, Bi, Zr, Hf, Ti, Sn, Ta, and Nb. As the halide solid electrolyte material, $Li_3YCl_6$ or $Li_3YBr_6$ may be used, for example. Two or more selected from these may be used in combination.

The positive electrode 101 or negative electrode 103 may include a nonaqueous electrolyte solution, a gel electrolyte, or an ionic liquid so that the transfer of lithium ions can be facilitated to improve the output characteristics of the battery.

The nonaqueous electrolyte solution may include a nonaqueous solvent and a lithium salt dissolved in the nonaqueous solvent. Examples of the nonaqueous solvent include cyclic carbonates, chain carbonates, cyclic ether solvents, chain ether solvents, cyclic ester solvents, chain ester solvents, and fluorinated solvents. Examples of the cyclic carbonates include ethylene carbonate, fluoroethylene carbonate, propylene carbonate, and butylene carbonate.

Examples of the chain carbonates include dimethyl carbonate, ethyl methyl carbonate, fluoroethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorinated solvents include fluoroethylene carbonate, fluoromethyl propionate, fluorobenzene, fluoroethyl methyl carbonate, and fluorodimethylene carbonate. One nonaqueous solvent selected from these may be used alone. A mixture of two or more nonaqueous solvents selected from these may be used. The lithium salt may be a lithium salt of a fluorosulfonyl-group-containing compound.

The gel electrolyte may be a polymeric material in which a nonaqueous electrolyte solution is held. Examples of the polymeric material include polyethylene oxide, polyacrylonitrile, polyvinylidene fluoride, polymethylmethacrylate, polymers having an ethylene oxide linkage, and polymers of a vinylene carbonate species, which is involved in the polymeric electrolyte.

Examples of a cation that may be included in the ionic liquid include cations of aliphatic chain quaternary salts, such as tetraalkylammonium and tetraalkylphosphonium; cations of aliphatic cyclic ammonium, such as pyrrolidiniums, morpholiniums, imidazoliniums, tetrahydropyrimidiniums, piperaziniums, and piperidiniums; and cations of nitrogen-containing heterocyclic aromatic compounds, such as pyridiniums and imidazoliums. Examples of an anion that may be included in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2F)_2^-$, $N(SO_2CF_3)(SO_2C_4F_9)^-$, and $C(SO_2CF_3)_3^-$. The anion may be $N(SO_2F)_2^-$. The ionic liquid may contain a lithium salt. The lithium salt may be a lithium salt of a fluorosulfonyl-group-containing compound.

The positive electrode 101 or the negative electrode 103 may include a conductive additive so that electrode resistance can be reduced.

Examples of the conductive additive include graphites, such as natural graphite and artificial graphite; carbon blacks, such as acetylene black and Ketjen black; conductive fibers, such as carbon fibers and metal fibers; metallic powders, such as carbon fluoride powders and aluminum powders; conductive whiskers, such as zinc oxide whiskers and potassium titanate whiskers; conductive metal oxides, such as titanium oxide; and conductive polymeric compounds, such as polyaniline, polypyrrole, and polythiophene. In instances where a carbon conductive additive is used as the conductive additive, a cost reduction can be achieved.

Examples of a shape of the lithium ion secondary battery include coin shapes, cylindrical shapes, prismatic shapes, sheet shapes, button shapes, flat shapes, and stack shapes.

EXAMPLES

The present disclosure will now be described in more detail with reference to examples. The present disclosure is in no way limited to the examples, and many modifications may be made by those with common knowledge in the art within the scope of the technical spirit of the present disclosure.

Example 1

Preparation of Polymeric Electrolyte

Two solutions with different lithium bis(fluorosulfonyl)imide concentrations were prepared, each by dissolving lithium bis(fluorosulfonyl)imide (Kishida Chemical Co., Ltd.) in 10 mL of vinylene carbonate (Aldrich). The concentrations were 2.0 mol/L and 3.0 mol/L. Next, 10 mg of 2,2'-azobis(isobutyronitrile) (Tokyo Chemical Industry Co., Ltd.) was added to the solutions, and the resulting materials were each placed between glass plates and heated at 60° C. for 24 hours. Next, the resultants were further heated at 80° C. for 10 hours. In this manner, film-shaped polymeric electrolytes were prepared.

Measurement of Ionic Conductivity

Figure 2:
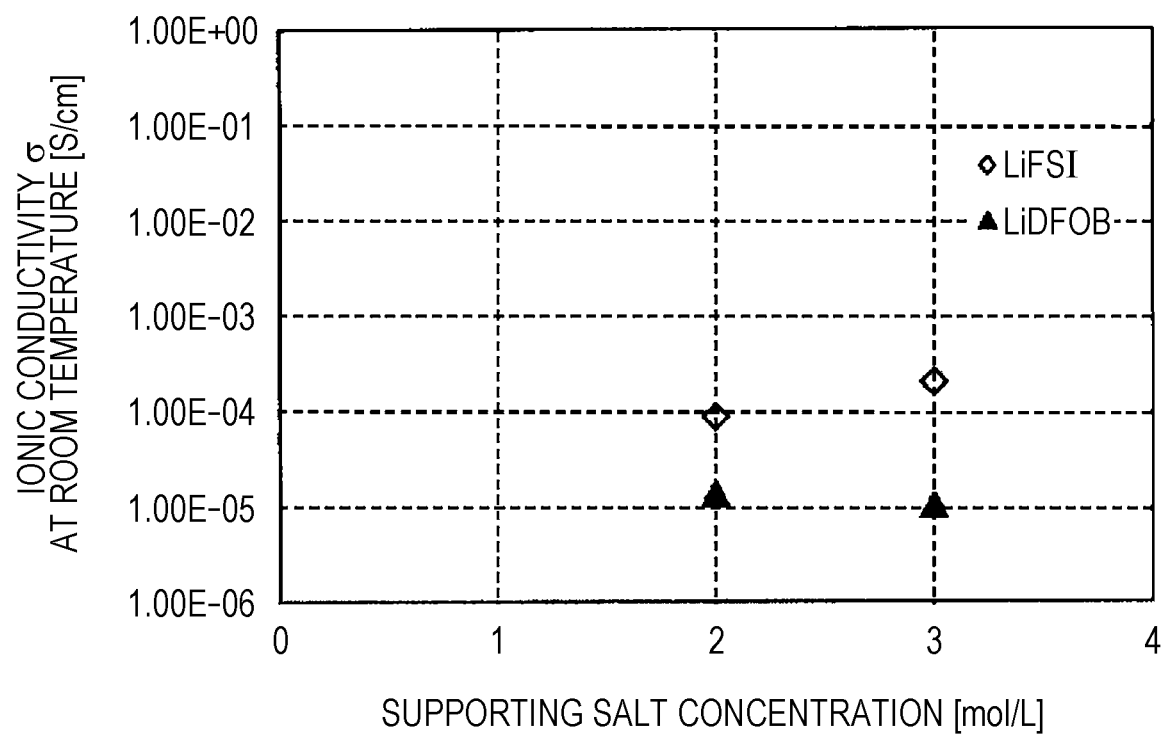
FIG. 2 is a graph illustrating an ionic conductivity a, which was calculated from the results of an impedance measurement performed in Example 1 and Comparative Example 1.

A Ni plate was used as a working electrode, and a Ni plate was used as a counter electrode. The prepared polymeric electrolytes were punched into a shape of φ9 mm. Next, each of the polymeric electrolytes was secured between the working electrode and the counter electrode, and, accordingly, a battery evaluation test cell (Swagelok cell) was assembled to be used as a test cell. An impedance measurement was performed at room temperature (25° C.) by using a VSP-300 (Bio-Logic Science Instruments). The frequency range for the measurement was 0.1 MHz to 7 MHz. The measurement results are shown in FIG. 2. In FIG. 2, "LiFSI" denotes Example 1.

Comparative Example 1

Preparation of Polymeric Electrolyte

Film-shaped polymeric electrolytes were prepared as in Example 1, except that lithium difluoro(oxalato)borate (Tokyo Chemical Industry Co., Ltd.) was used instead of lithium bis(fluorosulfonyl)imide. As in Example 1, two solutions with different lithium difluoro(oxalato)borate concentrations were prepared, and the concentrations were 2.0 mol/L and 3.0 mol/L.

Measurement of Ionic Conductivity

The ionic conductivity, denoted as a, of each of the obtained polymeric electrolytes was measured as in Example 1. The measurement results are shown in FIG. 2. In FIG. 2, "LiDFOB" denotes Comparative Example 1. In FIG. 2, the vertical axis represents the ionic conductivity a. The vertical axis is expressed in units of S/cm. The horizontal axis represents the supporting salt concentration. The horizontal axis is expressed in units of mol/L. The supporting salt for Example 1 was lithium bis(fluorosulfonyl)imide, and the supporting salt for Comparative Example 1 was lithium difluoro(oxalato)borate.

FIG. 2 is a graph of the ionic conductivity a, which was calculated from the results of the impedance measurement performed in Example 1 and Comparative Example 1. In Example 1, as the concentration of the supporting salt was increased from 2.0 mol/L to 3.0 mol/L, the ionic conductivity at room temperature was improved, as is apparent from FIG. 2. In contrast, in Comparative Example 1, even with the change in the concentration of the supporting salt from 2.0 mol/L to 3.0 mol/L, the ionic conductivity remained low, at approximately 1.00E-05, with no significant change being observed.

Example 2

Preparation of Polymeric Electrolyte

Two solutions with different lithium bis(fluorosulfonyl)imide concentrations were prepared, each by dissolving lithium bis(fluorosulfonyl)imide (Kishida Chemical Co., Ltd.) in 10 mL of vinylene carbonate (Aldrich). The concentrations were 4.0 mol/L and 5.0 mol/L. Next, 10 mg of 2,2'-azobis(isobutyronitrile) (Tokyo Chemical Industry Co., Ltd.) was added to each of the solutions. To these solutions, ethylene carbonate (EC) was added such that solutions with different ethylene carbonate (EC) concentrations were prepared. The concentrations were 25 mass %, 30 mass %, 35 mass %, 40 mass %, 45 mass %, and 50 mass %. The resulting materials were each placed between glass plates and heated at 60° C. for 24 hours. Next, the resultants were further heated at 80° C. for 10 hours. In this manner, film-shaped polymeric electrolytes were prepared.

Measurement of Ionic Conductivity

Figure 3:
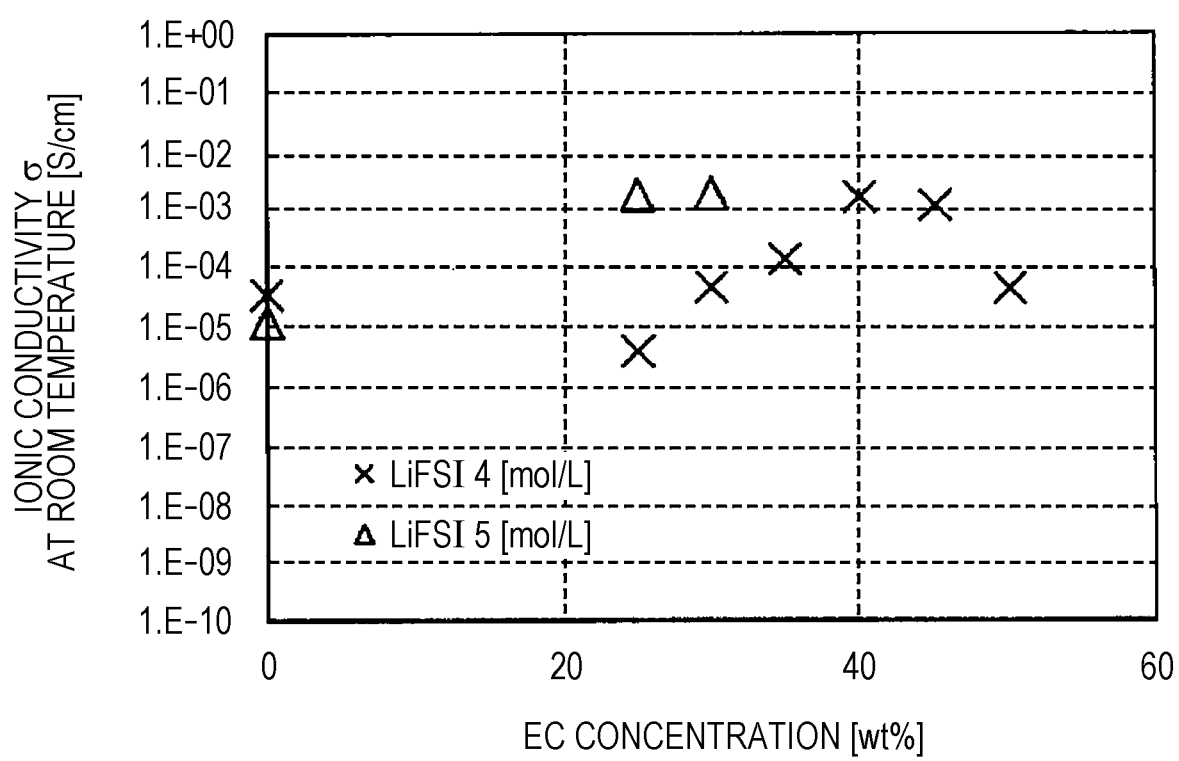
FIG. 3 is a graph illustrating an ionic conductivity a, which was calculated from the results of an impedance measurement performed in Example 2.

The ionic conductivity σ of each of the obtained polymeric electrolytes was measured as in Example 1. The measurement results are shown in FIG. 3. FIG. 3 is a graph illustrating changes in the ionic conductivity σ with respect to the amount of ethylene carbonate added. In FIG. 3, "LiFSI 4 mol/L" denotes the results of the instances in which the lithium bis(fluorosulfonyl)imide concentration was 4.0 mol/L, and "LiFSI 5 mol/L" denotes the results of the instances in which the lithium bis(fluorosulfonyl)imide concentration was 5.0 mol/L.

Test Example

A comparison experiment was conducted in which Comparative Example 2 was additionally performed. In Comparative Example 2, lithium bis(trifluoromethanesulfonyl)imide (LiTFSI) was used; in Example 1 and Example 2, lithium bis(fluorosulfonyl)imide (LiFSI) was used; and, in Comparative Example 1, lithium difluoro(oxalato)borate (LiDFOB) was used. In the comparison experiment, these lithium salts were evaluated for solubility in vinylene carbonate (VC), film-forming ability, and the ionic conductivity σ. The ionic conductivity σ was measured by using the same method as that for Example 1.

Specifically, the experiment was performed by using the following method. Solutions were obtained by dissolving each of the three lithium salts in vinylene carbonate, with the concentrations of the lithium salts with respect to the vinylene carbonate being varied within a range of 1 mol/L to 5 mol/L. To 1 mL of each of the resulting solutions, 1 mg of 2,2'-azobis(isobutyronitrile) (Tokyo Chemical Industry Co., Ltd.) was added, and the resulting materials were placed between glass plates and heated at 60° C. for 24 hours. Next, the resultants were further heated at 80° C. for 10 hours. In this manner, film-shaped polymeric electrolytes were prepared. Note that regarding LiTFSI, production of a free-standing film was unsuccessful when the concentration was 1 mol/L, and, therefore, attempts to form a film were made with solutions of concentrations of 0.1 mol/L, 0.5 mol/L, and 0.75 mol/L. Regarding LiTFSI, a free-standing film was slightly formed when the concentration was 0.1 mol/L and when the concentration was 0.5 mol/L. The ionic conductivity associated with LiTFSI was measured by using the 0.1 mol/L solution, with which a battery evaluation test cell that enables the ionic conductivity measurement could be formed.

The solubility of the supporting salt, which served as an electrolyte, in vinylene carbonate (VC) and the film-forming ability of the polymeric electrolyte were evaluated according to the following evaluation criteria.

Solubility of supporting salt, which served as electrolyte, in vinylene carbonate (VC)

A: In an instance where a supporting salt is added at a concentration of greater than 5.0 mol/L, the dissolution of the supporting salt can be visually confirmed.

B: In an instance where a supporting salt is added at a concentration of 5.0 mol/L, the presence of undissolved solids can be visually confirmed, whereas in an instance where a supporting salt is added at a concentration of less than or equal to 2.0 mol/L, the dissolution of the supporting salt can be visually confirmed.

Film-Forming Ability of Polymeric Electrolyte

A: In an instance where a supporting salt is added to VC at a concentration of greater than 5.0 mol/L, a free-standing film forms.

B: In an instance where a supporting salt is added to VC at a concentration of 5.0 mol/L, no free-standing film forms, whereas in an instance where a supporting salt is added to VC at a concentration of less than or equal to 0.5 mol/L, a free-standing film forms.

The results of the evaluations of the solubility of the supporting salt, which served as an electrolyte, in vinylene carbonate (VC), the film-forming ability of the polymeric electrolyte, and the ionic conductivity at room temperature are shown in Table 1 below.

| | Example 1, Example 2 LiFSI | Comparative Example 1 LiDFOB | Comparative Example 2 LiTFSI |
|---|---|---|---|
| Structural formula | (LiFSI structure) | (LiDFOB structure) | (LiTFSI structure) |
| Solubility of supporting salt in VC | A | B | A |
| Film-forming ability of polymeric electrolyte | A | A | B |
| Ionic conductivity S/cm (room temperature, 3 mol/L) | $2.03 \times 10^{4}$ | $9.96 \times 10^{-6}$ | Unmeasurable ($3.66 \times 10^{-8}$ at 0.1 mol/L) |

In Comparative Example 1, the lithium difluoro(oxalato)borate did not fully dissolve in the vinylene carbonate when the concentration was greater than approximately 3 mol/L. Furthermore, the ionic conductivity was low. In Comparative Example 2, the lithium bis(trifluoromethanesulfonyl)imide became dissolved in the vinylene carbonate even when the concentration was 5 mol/L. However, in Comparative Example 2, in which the lithium bis(trifluoromethanesulfonyl)imide was used, a free-standing film was slightly formed when the concentration was 0.5 mol/L, which indicated that the film-forming ability was poor.

As shown in Table 1, it was confirmed that the solubility of the supporting salt in vinylene carbonate or the film-forming ability of the polymeric electrolyte significantly varies depending on the type of the supporting salt.

It is believed that as the concentration of lithium ions in the polymeric electrolyte increases, a carrier concentration increases, which increases the ionic conductivity. In Example 1 and Example 2, the lithium bis(fluorosulfonyl)imide became dissolved in the vinylene carbonate species even when the concentration of the supporting salt was high, namely 5 mol/L, and also, with the lithium bis(fluorosulfonyl)imide, a free-standing film could be obtained. Consequently, the polymeric electrolytes of Example 1 and Example 2 exhibited higher ionic conductivity than those of Comparative Example 1 and Comparative Example 2. Note that in Example 1 and Example 2, the lithium bis(fluorosulfonyl)imide became dissolved in the vinylene carbonate even when the concentration was 15 mol/L. Furthermore, Example 2 demonstrated that the polymeric electrolyte of the present disclosure can exhibit high ionic conductivity without significantly depending on the concentration of ethylene carbonate.

The lithium ion secondary battery of the present disclosure is suitable for use as a high-power lithium ion secondary battery.

What is claimed is:

1. A lithium ion secondary battery comprising:
a positive electrode;
a negative electrode; and
a polymeric electrolyte film disposed between the positive electrode and the negative electrode,
wherein the polymeric electrolyte film contains lithium bis(fluorosulfonyl)imide and a copolymer of a vinylene carbonate species and a fluoroolefin.

2. The lithium ion secondary battery according to claim 1, wherein the vinylene carbonate species is a compound represented by formula (1) below,

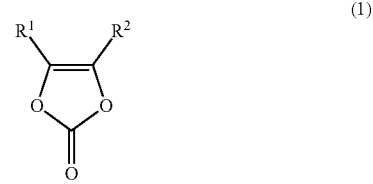

(1)

where $R^1$ and $R^2$ each independently represent a hydrogen atom, an optionally substituted alkyl group, an optionally substituted aryl group, or a halogen atom.

3. The lithium ion secondary battery according to claim 1, wherein the copolymer of the vinylene carbonate species is poly(vinylene carbonate).

4. The lithium ion secondary battery according to claim 1, wherein the polymeric electrolyte film contains a nonaqueous solvent in an amount less than 40 mass %.

5. The lithium ion secondary battery according to claim 4, wherein the nonaqueous solvent includes at least one selected from the group consisting of cyclic carbonates, chain carbonates, and sulfolanes.

6. The lithium ion secondary battery according to claim 4, wherein the nonaqueous solvent includes at least one selected from the group consisting of ethylene carbonate, fluoroethylene carbonate, propylene carbonate, dimethyl carbonate, ethyl methyl carbonate, diethyl carbonate, and sulfolane.

7. The lithium ion secondary battery according to claim 4, wherein the nonaqueous solvent includes ethylene carbonate.

8. The lithium ion secondary battery according to claim 1, wherein the polymeric electrolyte film is a free-standing film.

* * * * *